Dec. 22, 1931.  J. J. TURNER  1,837,381
PLASTER BOARD
Filed June 30, 1928  3 Sheets-Sheet 1

INVENTOR
John J. Turner
BY
ATTORNEYS

Dec. 22, 1931.   J. J. TURNER   1,837,381
PLASTER BOARD
Filed June 30, 1928   3 Sheets-Sheet 2
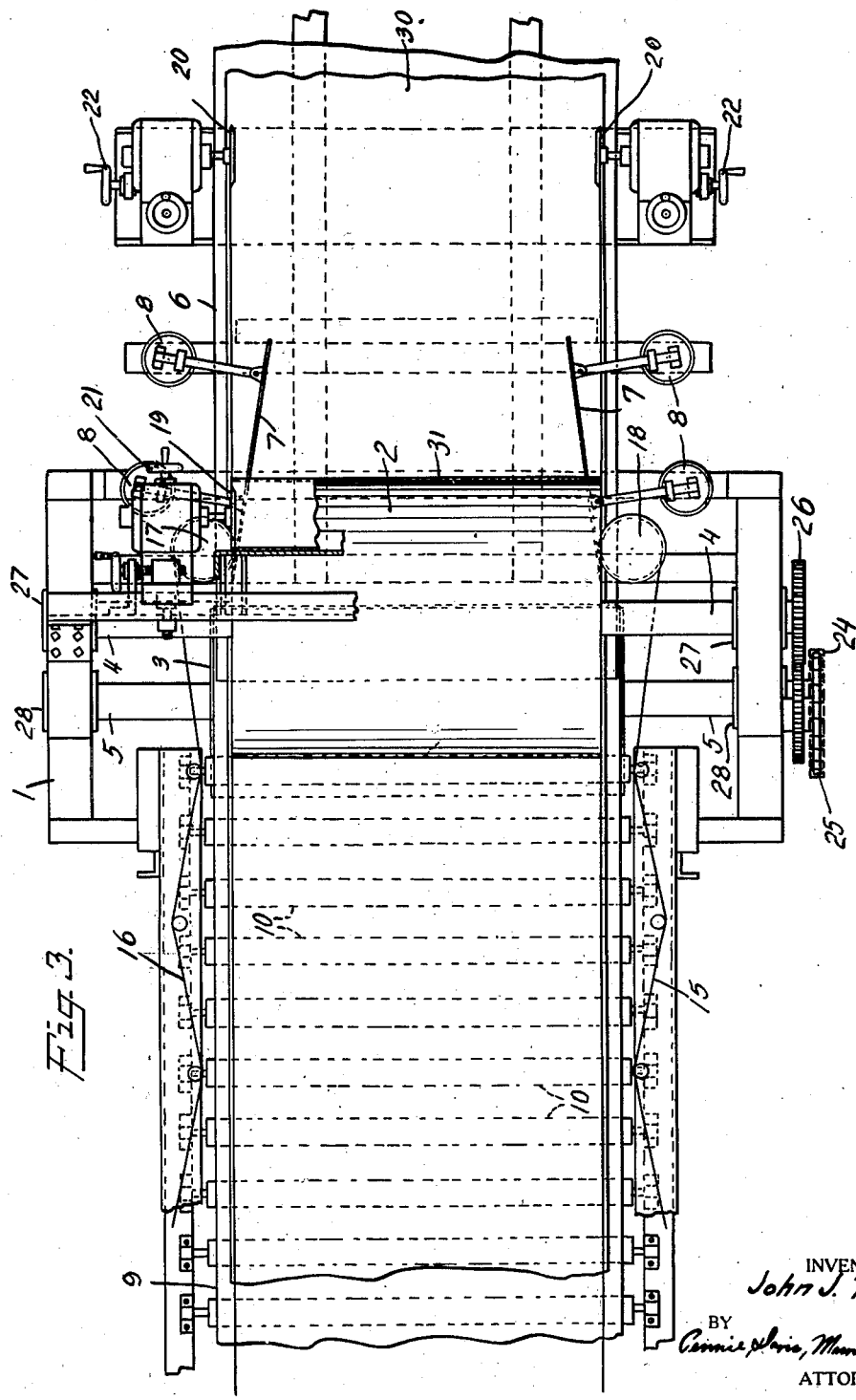
INVENTOR
John J. Turner
BY
ATTORNEYS

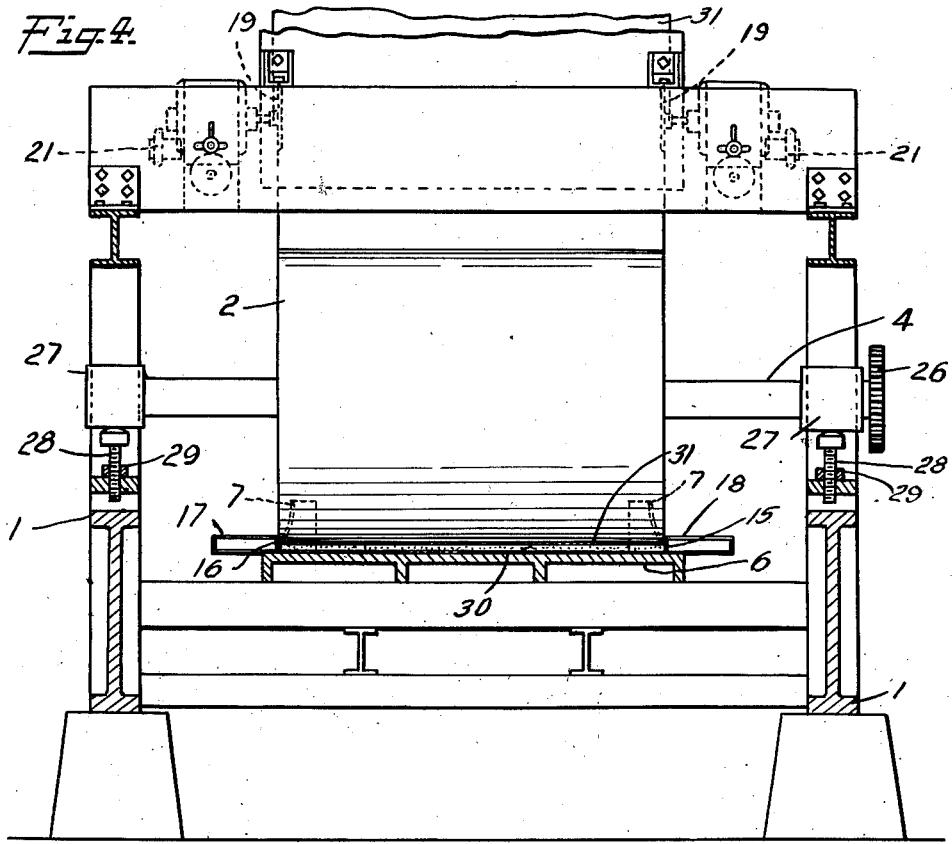

Patented Dec. 22, 1931

1,837,381

UNITED STATES PATENT OFFICE

JOHN J. TURNER, OF WILLIAMSVILLE, NEW YORK, ASSIGNOR TO NATIONAL GYPSUM COMPANY, OF BUFFALO, NEW YORK, A CORPORATION OF DELAWARE

PLASTER BOARD

Application filed June 30, 1928. Serial No. 289,427.

This invention relates to apparatus for use in the manufacture of plaster board and like materials and more particularly concerns improved apparatus for squeezing or pressing suitable plastic material into board form.

In the manufacture of plaster board or similar material, by the so-called continuous process, a suitable plastic mixture is delivered to a travelling sheet of paper or like material suitable for forming a cover sheet for the plaster board, and is pressed to the desired thickness between suitable squeeze rolls. A second cover sheet is preferably applied to the upper face or uncovered surface of the plastic material as it passes between the rolls, thus forming a plaster board comprising two paper cover sheets with a plaster core therebetween.

The plastic material is preferably deposited on the moving lower cover sheet in a moist and plastic condition in order that it may be readily shaped to the desired form. The material is kept from flowing over the edges of the cover sheet by suitable side walls or hopper sides. The lower cover sheet is supported by an extended deck or plate surface and is drawn under the squeeze rolls where the plastic material is squeezed or pressed to the desired thickness and the upper cover sheet is applied.

In the plaster board forming apparatus ordinarily used, two squeeze rolls with their axes lying in a vertical plane are employed, and the squeezing pressure is applied to the plastic material as the material passes between the two rolls. Since the contact between two cylindrical surfaces is a line, or at best a very narrow strip, the pressure applied to the plaster board from the above-described apparatus is confined to a very limited area with the result that the plastic material often slips beyond the squeezing point, giving rise to a wavy surface in the finished board.

With the above and other important considerations in mind, it is proposed in accordance with the present invention to provide improved apparatus for making plaster board. More specifically, it is proposed to provide apparatus of this nature by which the plaster board is formed while in contact with an extended plane surface, thus forming a plaster board which has a smooth and uniform surface.

In place of the two rolls disposed with their axes in the same vertical plane, as commonly used, this invention employs a roll or drum of suitable dimensions disposed above an extended deck plate. A lower roll is employed, not to assist in the squeezing operation, but to serve as a means for bringing a conveyor belt into contact with the board to convey the same away from the board forming apparatus. These two rolls are disposed one above the other, the lower or smaller roll being set ahead of the upper roll at a suitable distance to receive the plaster board as it leaves the deck plate.

The lower cover sheet contacts with the lower roll and is carried thereby and the upper cover sheet contacts with the upper roll, the intervening space between the two cover sheets being occupied by the plastic material which is under pressure from contact with the upper roll and the deck surface underneath. The deck plate on which the plastic material travels extends beyond the contact point of the upper roll and almost to the vertical center line of the lower roll. Since the lower roll is disposed slightly ahead of the upper roll, the entire squeeze pressure exerted on the plastic material takes place between the deck plate and the upper or large roll. By the use of the deck plate in conjunction with the upper squeeze roll in this manner, a plane surface is presented to the plastic material resulting in a plaster board of smooth and uniform surface.

In the present invention the wavy surface is avoided by the manner in which the plastic material is pressed between the large upper roll and the extended deck plate, as the deck plate extends beyond the point of contact between the large squeeze roll and the plastic material, the effect produced is substantially that of a lower squeeze roll of infinite diameter. In practice, the lower roll cooperates with the deck plate and a belt passes over this roll which supports the plastic material from the time it leaves the deck plate after being pressed to the desired thickness until the plaster board material becomes set or hardened. A metal strip in the form of a continuous belt or tape travels with the plaster board in contact with the edges thereof, as the board issues from the squeeze roll, to prevent the escape of any plastic material therefrom.

Not only does this invention provide means for forming plaster board with a smooth and uniform surface but further provides improved apparatus which may be operated more rapidly and with greater efficiency than has previously been possible.

Other specific objects, advantages, and characteristic features of the present invention will become apparent as the description thereof progresses.

In describing the invention in detail, reference will be made to the accompanying drawings in which Figure 1 is a sectional view of the plaster board apparatus of the present invention taken along line 1—1 of Fig. 3;

Fig. 3 is a plan view of the apparatus shown in Fig. 1; and

Fig. 4 is a sectional view taken along line 4—4 of Fig. 1.

Figures 1, 2:
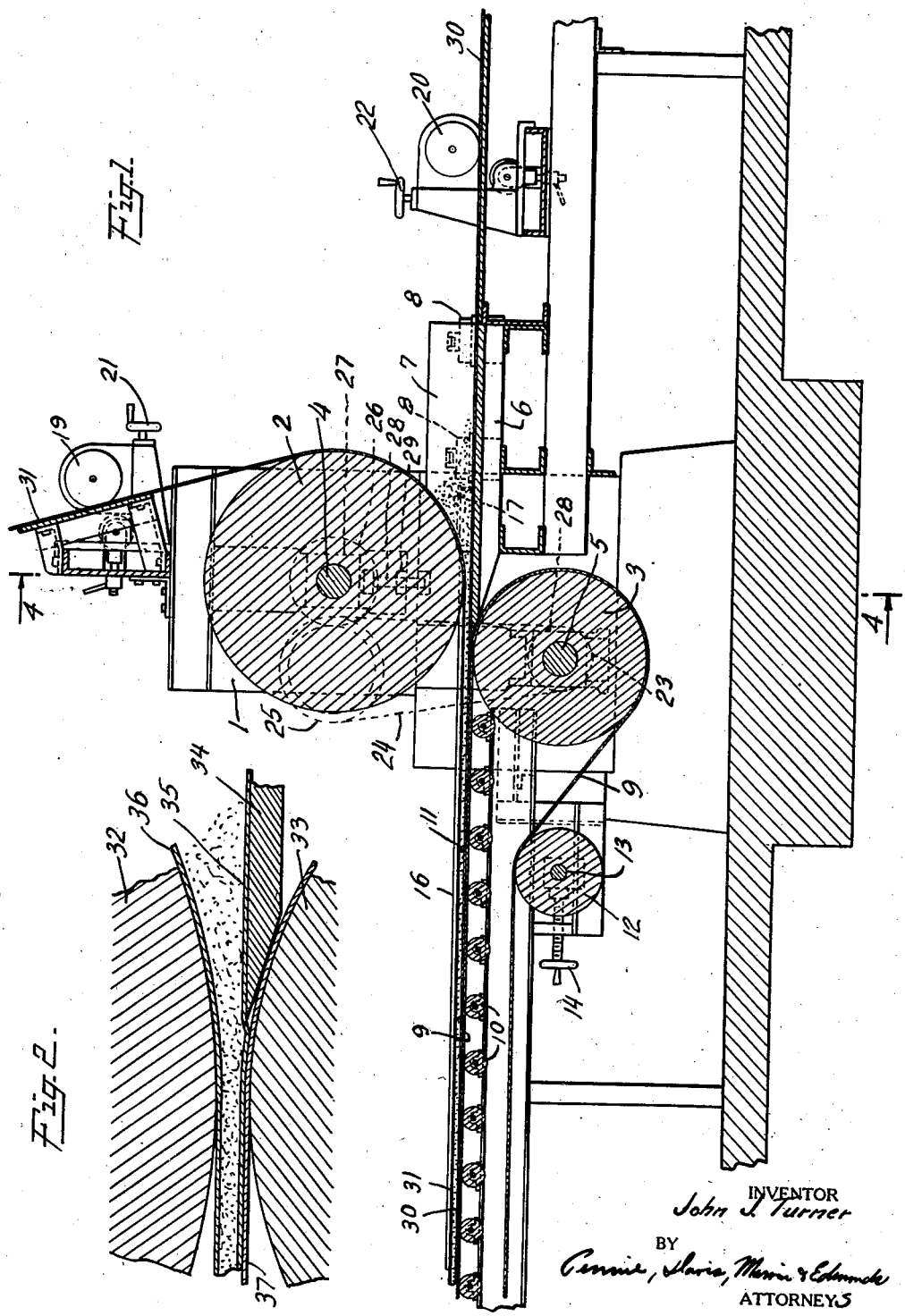
Fig. 2 is a sectional view of the arrangement of the squeeze rolls employed in the prior art.

Referring to the drawings and particularly to Figs. 1 and 3, the apparatus of the present invention comprises a frame 1, which supports two rolls 2 and 3 mounted on the shafts 4 and 5 respectively. A deck plate or platform 6 with hopper sides 7 and adjusting means 8 is suitably secured to frame 1 adjacent the rolls 2 and 3. The upper roll 2 moves in a clockwise direction when viewed as in Fig. 1 and the lower roll 3 rotates in a counter-clockwise direction when viewed in the same manner. The bottom cover sheet 30 travels along the deck 6 and receives a suitable amount of plastic mixture before passing under the squeeze roll 2.

The top cover sheet 31 is carried by roll 2 and is applied to the top face of the plastic mixture as the material passes underneath roll 2. The lower roll 3 supports an endless belt 9 which passes over the small rollers 10, and serves to carry the plaster board 11 away from the squeeze roll 2, said belt being returned by an end roll (not shown). An idling drum 12 mounted on shaft 13 serves as a stiffening or tightening means for the endless belt 9, this drum being adjustable by the adjusting means 14. The belt 9 is preferably a thick heavy belt composed of rubber, or suitable composition capable of affording adequate traction to the plaster board 11 as it issues from the squeeze roll 2. Two vertically disposed endless metallic strips or tapes 15 and 16, are provided to travel on rolls 17 and 18 at the same speed as the belt 9, these strips forming side walls that move along in contact with the edge of the plaster board and prevent the escape of any plastic material therefrom. The strips 15 and 16 are best shown in Fig. 3. These strips may also serve to press the paper cover sheet against the edge of the plaster board if it is desired to seal the edge thereof. Suitable cutting wheels or trimmers 19 and 20 with adjusting means 21 and 22 are mounted on frame 1 to cut or groove the edges of the top and bottom cover sheets respectively, as may be desired. Suitable driving means for the rolls 2 and 3 may be provided, such as the sprocket 23, with suitable drive connection 24 for engaging sprocket 25 which has a gear drive that engages gear 26 on roll 2. The rolls 2 and 3 are supported in any suitable manner and means for adjusting the height of roll 2 may be provided.

The shaft 4 supporting the roll 2 is carried in a journal block 27 which is adjustably supported in the frame 1 by means of the stud bolt 28. A locknut 29 threaded into frame 1 locks the stud 28 when the roll has been set at the desired position. The rolls 2 and 3 are of sufficient width to support the top cover sheet 31 and the continuous belt 9 respectively. The small rollers 10 are provided to furnish a surface over which the continuous belt 9 may travel, thus facilitating the movement of the plaster board 11 from the squeeze roll 2.

In the operation of my improved apparatus for forming plaster board, the lower cover sheet 30 composed of paper or any suitable material, is delivered to deck 6 by a suitable rotating roll (not shown). The grinding wheels 20 trim or groove the edges of the lower cover sheet 30 as the sheet travels along deck 6. A suitable plastic mixture is delivered to the lower cover sheet 30 as it travels in the direction of the squeeze roll 2. As the plastic material travelling on deck 6 reaches the contact point of the upper roll, the top cover sheet 31 is applied, and the mass is converted into board form by the deck 6 and the upper roll 2. As the plaster board issues from the roll 2 and the deck 6 it contacts with the continuous belt 9 travelling on roll 3, and is carried along for a suitable distance until the board has become set or hardened, after which it may be cut into the desired lengths by suitable cutting means (not shown).

In Fig. 2, squeeze rolls 32 and 33 of the type commonly employed in the manufacture of plaster board are shown. This view is presented to illustrate the unavoidable wavy or bulging effect which invariably takes place as the plastic material is squeezed between two rolls disposed one above the other with their axes in the same parallel plane. The contact area presented to the plastic mixture between rolls 32 and 33 can be nothing more than a line, or at the most a narrow strip, consequently there is no means to prevent the slipping of the plastic material between the cover sheets as pressure is brought to bear along this narrow contact area. At the point where the lower cover sheet 35 contacts with the bottom squeeze roll 32, the clearance between the rolls 32 and 33 is actually greater than it is at the point where the sheet leaves the deck plate 34. This naturally results in an expansion space within the cover sheets allowing the plastic material therein to bulge causing ridges to be formed in the plaster board. Squeeze rolls superposed coaxially as shown by Fig. 2 are further undesirable as there is no adequate means for accurately regulating the amount of plastic material that is subjected to pressure as the cover sheets reach the contact point of the squeeze rolls. Due to the abruptness with which the plastic material is subjected to pressure between the squeeze rolls, a certain amount of plastic mixture will have a tendency to squeeze back or lump up, thus causing the mixture to slip within the cover sheets. The plastic material will also be forced to the edges of the cover sheet with great pressure making it very difficult, if not impossible, for the metal strips travelling along the edges thereof to hold the mixture within the sheets. Therefore it is clear that squeeze rolls of the type illustrated by Fig. 2 are undesirable, as the plaster board produced by apparatus of this type would invariably have a wavy and uneven surface.

By extending the deck plate 6 substantially beyond the vertical center line of the squeeze roll 2, disposed thereabove, a new and useful result is effected. As the plastic material is drawn along the deck plate 6 to the rotating drum 2, pressure is exerted by the rotating drum and the squeezing operation takes place. A plane surface is presented to the plastic material during the squeezing operation by the flat stationary deck plate underneath and the rotating drum above, forming the mass into a plaster board of smooth and uniform surface. The thickness of the plaster board is determined by the amount of clearance allowed between the squeeze roll 2 and the deck plate 6. This clearance may be varied by adjusting the bolt 28 and locknut 29, which control the height of the squeeze roll 2. The end of deck plate 6 which is presented in close proximity to the surface of the lower roll 3, is bevelled in such a way that there is no appreciable difference in the level of the deck plate and of the continuous belt 9 onto which the plaster board passes after being pressed between the squeeze roll 2 and the deck plate 6.

From the description given, it will be seen that the plaster board apparatus of the present invention incorporates new and useful advantages. Due to the arrangement of the deck plate and the manner in which the squeezing operation is performed, the plaster is evenly compressed and the slipping of the plastic material and consequent waving of the board surface is completely avoided. Further, since the forming apparatus of this invention subjects the plaster board to a uniform and smooth pressure, the board may be formed at a higher speed and consequently with much greater efficiency than has heretofore been attained.

Although the plaster board apparatus of the present invention has been described in connection with certain specific embodiments, it should be clearly understood that the invention is not limited in its scope to the particular mechanical details shown and that certain changes, modifications and alterations may be made without departing from the scope of the invention as defined by the appended claims.

I claim:—

1. In a machine of the type described, the combination of a deck plate, a cylinder mounted above said plate and adapted to cooperate therewith to convert a mass of plastic material into a layer of final uniform thickness and density, said plate extending at least to the vertical center line of said cylinder, means for supplying a cover sheet to the deck plate and means adjacent said deck plate but removed from the vertical center line of said cylinder for conveying the cover sheet and the layer of plastic material away from the deck plate and cylinder.

2. In a machine of the type described, the combination of a deck plate, a squeeze roll rotatably mounted above said plate and adapted to cooperate therewith to convert a mass of plastic material into a layer of final uniform thickness and density, said plate extending up to and beyond the vertical center line of said roll, means for supplying a cover sheet to the deck plate, and a belt conveyor extending into close proximity to said deck plate removed from the area over which pressure is exerted on said plastic material by said cylinder for conveying the cover sheet and the layer of plastic material away from the deck plate and squeeze roll.

3. In a machine of the type described, the combination of a deck plate, means for supplying a bottom cover-sheet to said plate, a squeeze roll rotatably mounted above said plate, means for supplying a top cover sheet to said roll, said roll and plate being adapted to convert a mass of plastic material into a layer of final uniform thickness and density, a belt conveyor beyond the center line of said roll for conveying said plastic material away from the deck plate and cylinder, a travelling tape arranged at each side of the layer of plastic material for supporting the edges thereof while the material passes between said roll and said plate and along said conveyor, said deck plate extending beyond the vertical center line of said roll.

4. In a machine of the type described, the combination of a deck plate, a cylinder mounted above said plate and adapted to cooperate therewith to convert a mass of unformed plastic material into a layer of final uniform thickness and density, said plate extending at least to the vertical center line of said cylinder, and means adjacent said plate for conveying the formed layer of plastic material away from the cylinder and deck plate, said conveying means being arranged so that the plastic layer coming into contact therewith is not under compression.

5. In a machine of the type described, the combination of a deck plate, a cylinder mounted above said plate, and adapted to cooperate therewith to convert a mass of unformed plastic material into a layer of final uniform thickness and density, said plate extending at least to the vertical center line of said cylinder, means adjacent said plate for conveying the layer of plastic material away from the cylinder and deck plate, said conveying means being arranged so that the plastic layer coming into contact therewith is not under compression, and a travelling tape arranged at each side of said layer for supporting the edges thereof while the plastic material passes between the cylinder and the deck plate and along said conveyor.

In testimony whereof I affix my signature.

JOHN J. TURNER.